United States Patent Office 3,520,813
Patented July 21, 1970

3,520,813
METHOD AND COMPOSITION FOR CONTROLLING BOILER SCALE FORMATION
Gerald D. Hansen, Holicong, and Elizabeth A. Guthrie, Philadelphia, Pa., assignors to Betz Laboratories, Inc., Philadelphia, Pa., a corporation of Pennsylvania
No Drawing. Filed Nov. 3, 1966, Ser. No. 591,719
The portion of the term of the patent subsequent to June 16, 1987, has been disclaimed
Int. Cl. B01d *15/00;* C02b *1/14;* C02h *5/06*
U.S. Cl. 252—85                                          9 Claims

ABSTRACT OF THE DISCLOSURE

The present invention concerns a method and a composition for the treatment of boiler waters, and in particular, boiler waters containing calcium and magnesium impurities. The method of the invention provides for the control of scale formed from calcium and magnesium impurities in the water by adding to the water an acid having a dissociation constant of between about 3 and 8, a precipitating agent capable of reacting with said calcium and magnesium impurities in the presence of said acid to form a precipitate, and an adsorbent capable of adsorbing the precipitate formed. The acid is added in a quantity sufficient to reduce the rate of reaction of the impurities with the precipitating agent and sufficient to reduce the rate of particle growth and precipitation of the precipitate formed. Accordingly, the composition of the invention consists essentially of at least 0.1 mole of a precipitating agent, between 0.05 to 0.9 mole of an acid having a dissociation constant of between 3 to 8 for each mole of calcium impurities and between 1 to 1,000 parts by weight of an adsorbent for each 1,000,000 parts by weight of the water being treated.

In the operation of boilers impurities present in the boiler water are precipitated to form scale upon the boiler surfaces. The scale yielded by the precipitation and crystalline growth of these impurities constitutes an insulating barrier which greatly reduces the efficiency of the boiler. These scale forming impurities consist predominantly of calcium and magnesium salts such as calcium carbonate, sulfate and silicate, and the hydroxides and silicates of magnesium.

While the presence of such impurities in boiler water may be reduced by means of external or preliminary treatment of the boiler water, e.g., by means of subsidence, coagulation, filtration or lime-soda, zeolite or hot phosphate softening, such techniques do not completely remove the offending impurities and the problem is merely reduced in extent. As a consequence the boiler water of substantially all industrial boilers is subjected to an internal chemical treatment designed to combat the scale-forming tendency of entrained impurities.

The commonest chemical treatment of boiler water involves the combined use of a precipitating agent and an adsorbent. In such treatment the precipitating agent, normally a weak acid anion, reacts with the impurities present in the boiler water to form a manageable precipitate. At the same time, the adsorbent is adsorbed with the particles of precipitate to forestall or reduce their further growth or crystallization. When such a treatment is properly applied the scale-forming salts are converted to other salts of a more manageable nature, and the adsorbents function to yield a flocculent or fluid sludge which resists crystalline growth and adhesion to the boiler surfaces and may be removed during normal boiler operation. In the latter regard, portions of the boiler water are periodically vented in order to remove the suspended or dissolved solids which result from the concentrating effect of the continual conversion of the water to steam. Such a procedure is known as "blowdown," and if the scale-forming salts are precipitated as a properly conditioned sludge, such sludge is removed in the vented boiler water during blowdown. As a consequence, the occurrence and extent of scale formation is greatly reduced.

In any event, the combined effect of the precipitating agent and adsorbent is the creation of a sludge which is non-sticky or possesses a reduced affinity for the boiler surfaces due to the stabilizing effect of the adsorbent, and which is further characterized by a fluidity or flocculence caused by the physical presence of the interspersed adsorbent particles and the inhibited growth or crystallization of the precipitated particles which results from this adsorbent barrier.

It should be noted that when phosphate is employed as the precipitating agent in the above described treatment, the calcium impurities are precipitated primarily as calcium phosphate or hydroxy apatite which is susceptible to the action of the adsorbent and deposits as a fluid sludge. In the case of the magnesium impurities, the formation of magnesium phosphate and/or magnesium silicate is possible. If an appreciable excess of phosphate is employed, the magnesium impurities may precipitate as magnesium phosphate which forms a sticky, difficult to manage, sludge. However, if the boiler water contains adequate silica, the magnesium impurities are instead precipitated as magnesium silicate or serpentine which also constitutes a fluid, readily removable sludge. Consequently, in such treatment a large excess of phosphate is avoided and if the boiler water is deficient in silica an appropriate additive, e.g., sodium silicate, may be employed to insure that the magnesium impurities are preferentially precipitated as magnesium silicate rather than magnesium phosphate.

Perhaps the next most common treatment of boiler water involves the use of chelating agents. In this approach the boiler water impurities are chelated or complexed in order to retain them in a soluble, readily removable form whereby their deposition and the formation of scale is avoided or reduced.

Satisfactory control of the formation of boiler scale has been achieved by means of the utilization of the described chemical treatments. However, these treatments are attended by impediments which provide substantial room for improvement. In the case of the combined use of precipitating agents and adsorbents, the sludge which is formed commonly resists complete removal by blowdown and necessitates periodic shut-downs for the purpose of mechanical sludge or scale removal and cleaning. While such deposits are less bothersome than scale in respect to both their ease of removal and their influence upon boiler efficiencies, the necessity for their removal still represents lost operating time and an appreciable cleanup expense. In the use of chelating agents a variety of problems are posed. In the first instance, their use is frequently attended by corrosion resulting from attack upon the iron components of the boiler structure. Secondly, the chelating effect is dependent upon the use of the chelating agents in a stoichiometric ratio with the impurities in the boiler water. Since chelating agents are relatively expensive, this factor has limited their use to the treatment of boiler water containing very small quantities of impurities. At the same time, systems which have a reduced scale forming potential are less dependent upon chemical treatment of any type. Finally, the chelating effect of such agents is impaired or nullified by the presence of silica or hydroxyl ions which are frequently present in boiler water.

Accordingly, the broad objective of the present invention is the provision of methods and compositions for the treatment of boiler water, which effectively control the formation of scale upon the boiler surfaces from impurities present in the boiler water.

It is an object of the present invention to provide methods and compositions for the treatment of boiler water which reduce the formation of scale upon the boiler surfaces and permit the ready removal of scale-forming impurities from the boiler water.

Another object is the provision of methods and compositions for controlling the precipitation rate of salts which are present in the boiler water.

A further object is the provision of methods and compositions for the formation of precipitatable salts from the scale forming impurities present in boiler water, the reduction of the rate of precipitation of those salts which are formed, and the conversion of the precipitates to a form in which they may be readily removed.

The foregoing objects, and other objects rendered apparent by the specification and appended claims, are achieved by means of an extensixe improvement in existing chemical treatments of boiler water. Specifically, the invention serves to reduce the rate of the growth and precipitation of the particles of precipitatable salts which are formed during the chemical treatment of boiler water. As the result of this reduction in growth rate, the rate of precipitation of these particles is correspondingly reduced and this factor, together with the simultaneous retention of the particles in a condition in which optimal surface area for potential adsorption is available, i.e., the greater surface of a given volume of material which is subdivided into plural units as opposed to an integral mass, provides an improved condition in respect to adsorption with sludge conditioning agents. During the inhibited growth and precipitation of these particles, their prolonged retention in solution, the diminshed rate of their descent within the system, and the optimal surface area for adsorption which is provided by smaller particles, combine to yield a sludge which due to optimal adsorption with the adsorbent resists adhesion to the boiler surfaces, is inhibited or stabilized in respect to the crystallization and growth of the solid phase with consequent scale formation by means of the adsorbent interspersed between adjacent precipitate particles, and is characterized by a "fluffy" or low density nature which facilitates removal during blowdown.

This highly desirable effect is achieved by superimposing acids having prescribed dissociation characteristics upon a chemical treatment employing a weak acid anion precipitating agent in combination with an adsorbent. More precisely, the boiler water is treated with the precipitating agent, the adsorbent, and an acid having a dissociation constant or pKa (negative log of the dissociation constant) of between 3–8. It has been found, as will be subsequently discussed and shown, that the utilization of the described system drastically curtails the scale forming propensity of boiler water impurities and permits their conversion to a form in which they may be readily removed from the boiler during blowdown. In addition, previously formed scale is removed by the treatment. This result is achieved by utilizing the precipitating agent to convert the boiler water impurities to the desired salt and conditioning the resultant salt particles with an adsorbent which inhibits the growth of these particles and their adhesion to the boiler surfaces and thereby provides a manageable sludge. However, the increased effectiveness which is realized in the practice of the invention is the direct and demonstrable result of the reduction in the rate of particle growth and precipitation rate which is caused by the use and presence of the acid. Because of this rate reduction, in combination with the attendantly increased surface area of the precipitating particles, maximal adsorption is realized with extensive and highly desirable changes in the nature of the precipitated sludge. Specifically, the affinity of the precipitated particles for the boiler surfaces and their ability to form a crystalline scale is greatly reduced, while their flocculent nature renders them ideally suitable for removal during blowdown.

In the practice of the invention, the precipitating agent is employed in a quantity adequate to react with the calcium impurities which are present in the boiler water, to form the desired calcium salt. Normally, when phosphate is employed as the precipitating agent, a slight excess is desired, both to insure that complete reaction is achieved, and to serve as an indicator that the reaction is in fact achieved. In the latter regard, the quantity of phosphate in excess of that required for reaction serves as a residual in the boiler water which may be simply established by testing, e.g., color comparator testing with a molybdate reagent. When such testing reveals a phosphate residual, it is established that a phosphate feed adequate to provide the desired precipitating reaction is being maintained. At the same time, the quantity of phosphate employed is preferably controlled in respect to the extent of the excess, in order to curtail the previously discussed formation of sticky magnesium phosphate deposits. The use of such phosphate treatments, and the control of the quantity of treatment to conform to the above conditions, are widely practiced and within the skill of those accomplished in the art of boiler treatment.

When carbonate is employed as the precipitating agent, e.g., in the form of sodium carbonate or soda ash, control of the regime of chemical treatment is less stringent. In such case the feed of carbonate is again maintained at a level adequate to insure complete reaction with the calcium impurities, but the necessity for avoiding an excess of carbonate does not apply.

The quantity of adsorbent employed varies with the physical characteristics of the boiler water to be treated. One means of determining this quantity is by establishing the quantity of suspended solids which are present in the boiler water and utilizing a substantially equivalent quantity of the adsorbent on a weight basis. For example, if the boiler water to be treated contains 50 parts per million of suspended solids, and the adsorbent is added to and maintained in the boiler water at a level of 50–100 parts per million, satisfactory results may normally be expected. In any event, the quantity of adsorbent required may always be readily determined for a particular system on a trial and error basis.

Through experimentation, it has been found that the acid having the prescribed dissociation constant, should be employed in a mol ratio of 0.05 to 0.9:1 with the calcium which is present in the boiler water, i.e., determined as calcium carbonate.

The determination of the quantity of the treatments to be used in the practice of the invention is naturally dependent upon the chemical and physical characteristics of the boiler water to be treated. Consequently, the quantity of calcium, magnesium and silica impurities present in the water to be treated should first be determined. Calcium impurities may be determined by a titration method employing a color indicator which is sensitive to calcium ions but insensitive to magnesium ions. Such a technique is outlined by pages 344–5 of the "Betz Handbook of Industrial Water Conditioning" (sixth edition, 1962). The content of magnesium impurities is normally determined indirectly. Specifically, the water sample is first analyzed for hardness by a method such as that described by pages 368–9 of the Betz Handbook (ibid). Once hardness and calcium are established the subtraction of the calcium content from the total hardness yields the magnesium level. The silica content of the sample may also be readily determined by means of tests such as those set forth at pages 396–8 of the Betz Handbook (ibid). All of the foregoing tests are conventionally employed in the diagnosis and treatment of boiler water and in many cases are conducted on a daily or frequent basis by the boiler operating personnel.

Once the calcium, magnesium and silica values have been established, the application of the inventive methods to the particular boiler water is a simple matter. First, the quantity of the precipitating agent, i.e., water soluble phosphate or carbonate salt, may be established upon the basis of the quantity of calcium impurities, in that a quantity of the precipitating agent adequate to react with the calcium is preferably employed. In a preferred practice, one mol of the precipitating agent is utilized for each mol of calcium impurity present in the boiler water. When phosphates are employed as precipitating agents, a slight excess e.g. 0.1 to 0.5 mol, is desirable since the excess serves as an indicator that the intended reaction is being achieved. If no phosphate residual is noted during testing, one may assure that the quantity of calcium impurities has increased or its otherwise in excess of that quantity capable of being reacted with the phosphate, and that the unreacted portion of the calcium impurities will precipitate as undesirable scale forming salts. In such case, the quantity of phosphate being employed should be gradually increased until a slight residual is found upon testing. As previously noted, a substantial excess of the phosphate feed should be avoided if the formation of magnesium phosphate, a sticky, undesirable deposit, is to be averted. When a carbonate is employed as the precipitating agent, the consequences of an excess are negligible. In some instances, the joint use of phosphate and carbonate precipitating agents may be preferred. For example, when the hardness of the feedwater exceeds 60 p.p.m. a combined phosphate-carbonate treatment yields a desirable sludge at favorable economics. Obviously, the quantity of the precipitating agent may be reduced if treating economics take precedence over the harmful effects of scale formation. For example, if the boiler water is externally treated to remove a portion of the impurities, its scale forming potential is appreciably reduced. In such case, the chemical treatment could be reduced to less than optimal levels on the basis that the deterioration of the equipment to an irreparable state from other causes would coincide with the achievement of a degree of scale adequate to impair the operation of the boiler. Accordingly, the precipitating agent could be used in a less than mol to mol ratio with the calcium impurities. While the use of the precipitating agent in a molar ratio of 0.1–1.5:1 with the calcium impurities is preferred, it should be noted that when carbonate is employed, the ratio may be increased to 2:1 or higher without harm, and greater ratios of phosphate may also be used if the formation of magnesium phosphate is a negligible factor, e.g. due to the preferential formation of magnesium silicate rather than magnesium phosphate. However, in such case the excess precipitating agent does not function as a precipitating agent but may provide beneficial side effects, e.g. as an alkalinity controlling agent in the case of carbonate.

The quantity of the rate controlling agent which is employed may also be based upon the quantity of calcium impurities which are present in the boiler water. Specifically, it has been found that when the rate controlling agent is used in a 0.05 to 0.9:1 molar ratio with the calcium impurities, optimal results are achieved. A preferred ratio of rate controlling agent to calcium impurities is 0.25–0.5:1.

The quantity of the adsorbent is based upon the total quantity of calcium and magnesium impurities, or hardness, which is present in the boiler water. In a preferred practice, 0.5 to 4 parts by weight of the adsorbent are used for each part by weight of total calcium and magnesium impurities which is present. This relationship is not stoichiometric or molar in that the function of the adsorbent in regard to the precipitate is physical rather than chemical. Instead, the quantity of adsorbent to be employed is dependent upon the adsorbitive powers of the adsorbent, e.g., potential or polarity, in terms of the precipitate. For example, a high molecular weight polymeric adsorbent may possess several sites for adsorption throughout a single molecule and thus successfully adsorb a plurality of precipitate particles. Conversely, it may require molecules of an adsorbent of limited polarity to satisfy the potential of a single precipitate particle. It should be noted that greater quantities of the adsorbent may be employed without harm but that the beneficial effect of the adsorbent is normally not increased when it is employed in a quantity of more than 4 times the weight of the calcium and magnesium impurities. Since boiler water conventionally contains impurities capable of yielding precipitates within a predictable and recognized quantitative range, and because the effect and expense of an excess of adsorbent within the boiler water is negligible, the quantity of adsorbent employed preferably comprises between 1 to 1,000 parts by weight for each one million parts by weight of the boiler water.

In respect to the silica content of the boiler water to be treated, it should be noted that the natural silica content of the water may, and normally does, preclude the necessity for adding additional silica. Ancillary treatment with additional silica is preferably employed when the molar ratio between the magnesium impurities and the available silica is less than 0.5:1. In such case, water soluble silica salts are added, e.g. in the form of sodium silicate or metasilicate, until silica is present in at least a 0.5:1 molar ratio with the magnesium impurities, and preferably at least a 1:1 ratio or a slight excess of silica, e.g. 1.5:1. In this regard, an excess of silica is not harmful but at least an equimolar ratio is required if the magnesium is to be precipitated as magnesium silicate. It should be noted that water soluble silicates which are added to the system react with magnesium impurities to precipitate them and consequently must be considered as precipitating agents like the phosphates and carbonates.

Consequently, the preferred form of the inventive compositions may be defined as the combination of at least 0.25 and preferably no more than 2 mols of precipitating agent for each mol of calcium impurities; between 0.05 to 0.9 mol of rate controlling agent for each mol of calcium impurities; and between 1 to 1000 parts by weight of adsorbent for each 1,000,000 parts by weight of boiler water. A preferred treatment comprises a 0.3:1 molar ratio of the rate controlling agent and the calcium impurities, a 1.1:1 molar ratio of the precipitating agent and the calcium impurities, and 2 parts by weight of the adsorbent for each part by weight of total or combined calcium and magnesium impurities. In addition, when the boiler water to be treated has a natural silica content of less than an 0.5:1 ratio with the magnesium impurities, the addition of further silica in the form of water soluble silicates is preferred. Such additions should be calculated to yield a silica-magnesium impurities ratio of at least 0.5:1, and preferably at least 1:1, although higher silica ratios are acceptable and in many cases a silica excess is advisable in order to place the formation of magnesium silicate on a preferential basis, as opposed to magnesium phosphate. It should be noted that the addition of silica in such instances is preferred but not essential. Specifically, even if silica is not added the magnesium impurities will be precipitated, e.g. as magnesium phosphate, a less desirable but still manageable deposit.

It should be noted that the inventive method may be practiced in combination with other conventional chemical treatments in addition to the precipitating agent and absorbent. For example, oxygen scavengers such as sodium sulfite, catalyzed sodium sulfite and hydrazine which inhibit the corrosive effect of oxygen present in the boiler system, and anti-foam agents such as polyalkylene glycols and polyamides, e.g., polyethylene glycol and the reaction products of fatty acids and triethylene tetramine, which serve to prevent or reduce carryover, may be employed for their beneficial side effects in combination with the inventive methods.

The previously mentioned weak acid anions, hereafter referred to as "precipitating agents," are phosphates and carbonates. Any water soluble phosphate compound which is capable of reacting with the calcium impurities under the conditions extant within a boiler to form calcium phosphate, may be employed as the precipitating agent. Typical of such compounds are sodium tripolyphosphate, sodium tetra-, deca- and hexameta- phosphate, and other water soluble phosphate salts of potassium, lithium, ammonium and the like, although the molecularly dehydrated sodium tripolyphosphate is preferred. When carbonate is employed as the precipitating agent, similar criteria prevail. Specifically, a water soluble carbonate capable of reacting with the calcium impurities to form calcium carbonate under the conditions existing within the boiler is employed. While sodium carbonate is preferred, other carbonate salts such as potassium or lithium carbonate are also suitable. It should be noted that regardless of the nature of the precipitating agent, the demand for conjunctive treatment with an adsorbent remains unchanged. Specifically, the salts formed by the precipitating agent are still capable of forming harmful scale unless inhibited by means of the adsorbent. As previously discussed, water soluble silicates are also utilized as secondary or auxiliary precipitating agents under certain conditions, i.e., when the natural or existing silica content of the boiler water is low in relation to the quantity of magnesium impurities and the precipitation of the latter impurities as magnesium silicate is preferred.

In this regard the adsorbent may be selected from a broad array of diverse materials. The fundamental criterion for the selection of the adsorbent is the ability of the adsorbent selected to adsorb with the particles of calcium phosphate or calcium carbonate. While partially desulfonated lignosulfonates are preferred, the adsorbents may comprise tannins, starches, other lignins, seaweed derivatives such as sodium mannuronate, sodium alginate or agar-agar, or polymeric adsorbents or polyelectrolytes which may be represented by those polymers, or the water soluble salts thereof, which contain the group

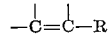

in which R is nitrile, amide, carboxyl or carboxyl alkyl. Typical of such polymers are the polyacrylamides, polyacrylates, sodium polyacrylate and the various copolymers thereof. Polymers of these types which have a molecular weight of between 5,000 to 15,000,000 are generally suitable. Such polymers are disclosed by U.S. Pat. 3,085,916.

As stated, the inventive methods involve an improvement in the effectiveness of chemical treatments involving the joint use of a precipitating agent and an adsorbent, by means of the addition of an acid hereafter referred to as the "rate controlling agent," "precipitation rate controlling agent," or "growth rate controlling agent." The rate controlling agent is an acid having a dissociation constant or pKa of between 3 and 8. While triglycollamic acid is preferred as the rate controlling agent, any other acid having a dissociation constant of the prescribed type, is also satisfactory. The selection of the rate controlling agent may be made by reference to a table of acid dissociation constants, such as that provided by many chemical handbooks, e.g., pages 1198–1202, Lange's "Handbook of Chemistry," 10th edition, 1961, McGraw-Hill Book Co., New York, N.Y. Examples of other highly satisfactory rate controlling agents are ethylene diamine tetra acetic acid, oxalic acid, hydro-sulfuric acid, meta and para toluic acid, citric acid, and the like. It should also be noted that acids having a plurality of dissociation constants which fall both within and without the prescribed range, are also satisfactory in the practice of the invention. Typical of the latter type of acid is the preferred rate controlling agent, triglycollamic acid, which has dissociation constants of 3.03, 3.07 and 10.70 (Schwarzenbach, G.; Kampitsch, E.; and Steiner, R., "Complexons I. Salt Formation of Nitrilotriacetic Acid." Helv. Chim. Acta: 828–40 (1945)). The operability of such rate controlling agents having diverse dissociation constants will be rendered apparent by subsequent discussion. However, it should presently be stated that an acid or rate controlling agent having a dissociation constant of between 3 to 8 is capable of exerting the effect desired in the practice of the invention. Naturally, such factors as cost, availability and undesirable ancillary effects such as corrosion of the boiler equipment may render some acids more or less suitable, but do not relate to their efficacy in the practice of the invention. For example, carbonic acid has a suitable dissociation constant and is operable in the control of scale by means of the inventive technique. However, carbonic acid also exerts an extremely corrosive effect within a boiler system and this side effect would have to be considered if carbonic acid was employed in the inventive use. For example, its use might require the simultaneous use of a corrosion inhibitor. However, the utilization of such criteria in the selection of the rate controlling agent are well within the ken of those skilled in the art of boiler treatment. It should be noted that the selection of the prescribed dissociation constant range is not an arbitrary one but is instead based upon experimentation and discovery conducted and evolved in the development of the present invention. Specifically, the rate controlling agent must not compete to any substantial degree with the precipitating agent to the detriment of the formation of the desired precipitate. As has been determined, and as is substantiated hereafter, acids having a dissociation constant of between 3 to 8 will effectively control the precipitation rate of the salts which are formed without interfering with the actual formation of these salts, e.g., by competitive reactions, inter-reactions or complexing effects. This fact is particularly noteworthy in that some of the acids employed as rate controlling agents in the practice of the invention have previously been utilized to prevent the formation of the salts which are preferentially formed by the invention. This has resulted from the fact that the previous use of such acids was conducted in the absence of a weak acid anion such as the inventive precipitating agents. In the absence of such anions the acids form a complex with the calcium impurities of the boiler water to maintain their solubility and prevent precipitation. However, when a weak acid anion is present, as in the practice of the invention, an opposed effect is realized. Specifically, the weak acid anion rather than the acid, reacts with the boiler water impurities, and the acidic rate controlling agent functions solely in the reduction of the rate of particle growth and precipitation of the salts formed from the reaction of the impurities with the weak acid anion. The inhibiting or controlling effect of the inventive rate controlling agents is rendered apparent when one considers the environment of use employed by the invention. Specifically, both the precipitating agent and the rate controlling agent are capable of a reaction or complexing with the impurities, and in the absence of either compound the reaction of the other compound would proceed. However, when both the precipitating agent and the rate controlling agent are simultaneously present in the system, the reaction between the impurities and the precipitating agent is rendered preferential by this environment. At the same time, the very presence of the rate controlling agent which unsuccessfully competes in the bid for reaction with the impurities, serves to reduce the rate with which the reaction between the impurities and the precipitating agent would proceed were it not for the inhibiting presence of the rate controlling agent. The dissociation constant of the acid determines its potential reactivity with the calcium impurities, and similarly determines the competitive or inhibiting effect of the acid upon the reaction growth and precipitation of the precipitating agent and calcium impurities and the precipitate formed therefrom. Stated somewhat differently, the acid is selected for its potential reactivity with the impurities and the inhibiting effect which results from the competitive effect created by this potential reactivity. Since the dissociation constant is an indicator of the potential reactivity of the acid, and accordingly of the competitive effect, it may be employed as the means of selecting a suitable acid as the rate controlling agent.

While the most convincing evidence of the efficacy of the present invention is the fact that boilers treated in accordance therewith are substantially clean, i.e., sludge and scale free upon being opened for inspection, convincing data in support of both the efficacy of the invention and the mechanism by which it is believed that these results are achieved has been accrued in the course of this development. Included in this data are demonstrations that: the calcium impurities react with the phosphate to yield calcium phosphate rather than complexing or reacting with the acid rate controller; the magnesium impurities react with silica to yield magnesium silicate rather than complexing or reacting with the acid rate controller; the acid rate controller reduces the particle size of the precipitates which are formed and consequently influences both the rate of precipitation and the degree of adsorption with the adsorbents; and the degree of adsorption is increased by means of the rate controlling agent.

Since many of the rate controlling agents employed in the practice of the invention might be expected to react with, or complex, the metallic impurities, a test designed to explore this possibility was conducted.

In the test series calcium impurities typical of those which occur in boiler water were combined with a precipitating agent, i.e., sodium phosphate; a rate controlling agent, i.e., triglycollamic acid; and silica; and studied to determine the inter-reaction which actually occurs between the impurities and the precipitating and rate controlling agents. In the execution of the study the ingredients were added to distilled water, boiled for one hour at one atmosphere, and filtered through a series of membrane filters. The filtrates were subjected to testing for phosphate, magnesium and silica while the filters underwent X-ray analysis to yield the findings set forth by Table 1:

TABLE 1

| Sample | Quantity of potential reactants in the sample (mols/liter×10⁻³) | Quantity remaining in the filtrate | Filter deposits |
|---|---|---|---|
| No. 1: | | | |
| Calcium impurities | 9.0 | 2.0 | |
| Phosphate | 9.0 | 4.0 | Ca/PO₄ |
| Triglycollamic acid | 9.0 | 7.8 | |
| No. 2: | | | |
| Magnesium impurities | 9.0 | 1.38 | |
| Silica | 9.0 | 0.5 | Mg/SiO₂ |
| Triglycollamic acid | 9.0 | 8.2 | |

As may be observed, X-ray analysis of the filter deposits indicates that the desired precipitates, i.e., calcium phosphate and magnesium silicate, are formed. At the same time, the reduced quantities of calcium, magnesium, phosphate and silica in the filtrate, and the substantially undiminished quantities of the rate controlling agent, indicate that the formation of the desired precipitate with the precipitating anion is preferential and any reaction or complexing of the impurities with the rate controlling agent is negligible if extant. In all cases, precipitation occurred and the X-ray analysis revealed the presence of the metal ion and the precipitating ion in the precipitate. Comparable results were also realized when ethylene diamine tetra acetic acid was substituted for the triglycollamic acid.

In regard to the preciption of the magnesium impurities, it should be noted that such precipitation may be achieved in the absence of chemical treatment. As shown by Table 1, the magnesium impurities react with silica to yield magnesium silicate. Many boiler waters contain silica in a quantity adequate to react with the magnesium and precipitate it as magnesium silicate. In such case, the present invention may merely control the rate of magnesium precipitation as magnesium silicate and permit maximum adsorbance with the adsorbents employed, to provide a desirable and readily manageable sludge. In the event that phosphate is employed as the precipitating agent and fed in excess of the required quantity, the magnesium may be precipitated as magnesium phosphate which yields a sticky sludge. In such case, the inventive techniques again function to reduce the precipitation rate of the magnesium phosphate while yielding maximum potential for adsorption due to the increased surface area of the smaller particles which are provided, and thus produce as improved sludge. The precipitation of magnesium in the most desirable form, i.e., as magnesium silicate, may be achieved by (1) insuring that silica is available in a quantity adequate for reaction with, and the precipitation of, the magnesium impurities which are present, and (2) maintaining a quantity of phosphate which is not conducive to the formation of magnesium phosphate. The first objective may be achieved by determining the quantity of magnesium and silica impurities which are present in the boiler water, and if the silica is not present in a quantity adequate to yield the desired precipitate, increasing the silica level through treatment with a compound such as sodium silicate. The second objective is accomplished by matching the phosphate treatment level to that quantity required for the precipitation of the quantity of calcium impurities which are present in the boiler water. A slight excess of phosphate is desirable to serve as a residual and a testing indicator of the adequacy of the treatment and the achievement of the desired degree of precipitation. So long as the phosphate excess is maintained at the low level required for testing and the silica level is properly maintained, the formation of appreciable quantities of magnesium phosphate will be avoided. As previously noted, even if magnesium phosphate is experienced, the inventive technique will serve to control its precipitation, provide maximum adsorption and consequently yield an improved sludge.

In order to determine whether the preferential formation of calcium phosphate continues, solutions containing calcium impurities, phosphate and triglycollamic acid were boiled at one atmosphere for periods of 30, 60 and 90 minutes, and then filtered. On this basis it was found that the quantity of calcium phosphate precipitated (based on the theoretical quantity which could be derived from the system) was increased from 80%, to 87% to 89.5% as the period of boiling was increased. Accordingly, it may be surmised that substantially all of the calcium impurities would be precipitated as calcium phosphate in the environment of an industrial boiler.

For the purpose of further investigating the inter-reactions of the precipitating agents, rate controlling agents, and calcium impurities, appropriate samples were studied by the potentiometric methods of Schwarzenbach and Bjerrum ("Metal Amine Formation in Aqueous Solution," Haase, Copenhagen, 1941). Samples containing triglycollamic acid and calcium impurities were studied in both the presence and absence of sodium phosphate. Similarly, ethylene diamine tetra acetic and calcium impurities were studied in the presence and absence of sodium phosphate. In both cases the presence of the phosphate yielded potentiometric curves which indicated the formation of a salt in a competitive system of two reacting anions. When considered with the results of Table 1, it is apparent that calcium phosphate is formed in the presence of the second anion, i.e., the rate controlling agent, which competes for, but does not achieve, reaction with the calcium impurities.

Since the above studies were conducted in environments which approximate without precisely duplicating an actual boiler, further tests were conducted in the experimental boilers depicted in FIGS. 22–6, page 159, of the "Betz Handbook of Industrial Water Conditioning"

(ibid). These experimental boilers are miniaturizations of typical industrial boilers. In order to insure that the inventive mechanism was not interfered with by other impurities contained by the boiler water, a sample of boiler water containing 9.7 p.p.m. of $PO_4$, 3.0 p.p.m. of $Ca^{++}$ and 55.5 p.p.m. of triglycollamic acid was obtained from the experimental boilers. To this sample was added 27.2 pp.m. of $Ca^{++}$ to yield the theoretical $Ca^{++}:PO_4$ mol ratio (0.6:4.0 mols) required to achieve the complete reaction of the calcium ions and phosphate which were then present in the system. The sample was then boiled for 30 minutes and upon analysis revealed a $PO_4$ of 0.2 p.p.m. Sinse the phopshate can only react with the $Ca^{++}$, and not with the triglycollamic acid, it may be safely assumed that the phosphate was completely consumed in reaction with the $PO_4$ to form calicum phosphate.

All of the above showings have been designed to demonstrate that when calcium impurities are exposed to the combination of a weak acid anion precipiating agent and an acid having a dissociation constant of between 3 to 8, reaction with the precipitating agent is preferential despite the fact that both compounds are potentially reactive with the calcium impurities. Such demonstrations have been made with a number of acids having the prescribed dissociation characteristics. To a limited extent, these showings have also indicated that the presence of the rate controlling agent exerts a competitive effect which could be expected to curtail the reaction rate of the calcium impuriies and the precipitating agent, i.e., the potentiometric studies.

However, the effect of the rate controlling agent in reducing the rate of formation, growth and precipitation of calcium phosphate, with a consequent reduction in the size of the calcium phosphate particles and an increase in the surface of these particles, is best demonstrated by other means.

To this end, samples containing the same quantity of calcium and phosphate, but progressively increased quantities of the rate controlling agent, were prepared and tested. These samples all comprised $9.0 \times 10^{-3}$ mols of calcium and $5.4 \times 10^{-3}$ mols of phosphate in distilled water, but the quantity of the rate controlling agent (mol percentage of rate controlling agent:calcium) was gradually increased from 0 to 75%. Each example was boiled for one half hour, filtered through a 0.8 micron membrane filter, and the percentage of calcium phosphate particles which passed through the filter was determined, as shown by Table 2:

TABLE 2

| Sample No. | Mol percent of triglycollamic acid: calcium contained by sample | Percentage of calcium phosphate particles which passed through a 0.8 micron filter |
| --- | --- | --- |
| 1 | 0 | 2 |
| 2 | 5 | 35 |
| 3 | 75 | 42 |

As may be observed, the addition of the rate controlling agent drastically reduced the size of the calcium phosphate particles and the size reduction realized was further increased as the quantity of acid was increased. While this data, does not directly demonstrate a reduction in the precipitation rate, it does clearly reveal a reduction in the size of the particles of precipitate and such a reduction is always accompanied by a decrease in the precipitation rate. This same approach was employed to determine the effect of various ratios of the rate controlling agent. Specifically, it was found that when the mol ratio of rate controlling agent:calcium ions was increased above 1:1, the decrease in particle size was not appreciably increased. Specifically, the benefit realized by employing a mol ratio of 2:1 as opposed to 1:1 was almost nonexistent. Since the rate controlling agent represents an appreciable portion of the treatment cost of the inventive methods, the benefit realized when the ratio is increased above 1:1 is disproportionate to the increased cost. Consequently, rate controlling agent:calcium ratios of less than 1:1, and preferably 0.25–0.5:1 are preferred.

A study such as that discussed above in respect to Table 2, was also conducted with oxalic acid. The results of that study are set forth in Table 2A below:

TABLE 2A

| Sample No. | Mol percent of acid: calcium contained by sample | Percentage of calcium phosphate particles which passed through a 1.2 micron filter |
| --- | --- | --- |
| 1a | 0 | 29 |
| 1b | 25 | 60 |
| 1c | 95 | 80 |

It must again be noted that the addition of oxalic acid as a rate controlling agent greatly reduced the size of the calcium phosphate particles and further particle size reduction was realized as the quantity of rate controlling agent was increased. Obviously, the rate controlling agent has controlled and reduced the rate of particle growth, with a consequent reduction of the precipitation rate, and if an adsorbent was present in the system it would be provided with a longer time in which to adsorb with the particles prior to their precipitation, and with the greater surface area for adsorption which is presented by smaller particles.

The foregoing tests have demonstrated that the calcium impurities react preferentially with the precipitating agent, but that the rate controlling agent functions to reduce the rate of growth of the particles of precipitate formed by that reaction, with a consequent reduction in the rate of precipitation and an increase in the available surface area of the particles of precipitate present within the system. However, mere control of the precipitation rate will not serve to prevent the formation of boiler scale. Irrespective of the precipitation rate, if the particles are in fact precipitated they will deposit on the boiler and experience crystalline growth to form scale. Accordingly, the inventive improvement must be combined with the use of adsorbents which are conventionally employed in boiler treatments. In essence, the inventive technique renders the adsorption of the precipitate more effective, to yield a manageable sludge which is readily removed by blowdown before scale formation can occur. This improved efficiency is the direct result of both the slower precipitation rate which exposes the particles of precipitate to the adsorbent for a larger period, and the fact that the reduced size of the particles resulting from the retarded growth rate, presents an increased surface area for adsorption.

In order to determine that such improved adsorption is in fact achieved, another test series was conducted. In these tests, samples containing an adsorbing agent and gradually increased quantities of the rate controlling agent were prepared and their absorbance was determined spectrophotometrically. Each sample consisted of distilled water containing $5.4 \times 10^{-3}$ mols of phosphate, $9.0 \times 10^{-3}$ mols of calcium impurities, and 40 parts per million by weight of an adsorbent, with the quantity of the rate controlling agent increased from 0 to 50 mol percent among the different samples. The adsorbent employed in these tests was partially desulfonated sodium lignosulfonate. Each sample was boiled for ½ hour, filtered through a 0.05 micron filter, and absorbance values of the precipitate were determined as shown by Table 3:

TABLE 3

| Sample No. | Quantity of triglycollamic acid contained by the sample (mol percent) | Absorbance value ($\Delta A$) |
| --- | --- | --- |
| 1 | 0 | 0.245 |
| 2 | 10 | 0.290 |
| 3 | 50 | 0.380 |

As is apparent, the absorbance of these samples was increased as the quantity of rate controlling agent was increased. Absorbance was increased by 18% with 10 mol percent of the rate controlling agent, and by 55% when the quantity of rate controlling agent was 50 mol percent.

To demonstrate that such enhanced adsorbance is also realized in systems closely duplicating those formed in boilers, an additional test was conducted. Specifically, an admixture of distilled water containing $5.4 \times 10^{-3}$ mols of phosphate and $9.0 \times 10^{-3}$ mols of calcium impurities was prepared. The admixture was then divided into 3 equal portions and one portion of this admixture was retained as a control while an adsorbent, and the combination of a rate controlling agent and adsorbent, were added to the two remaining portions of the mixture. The rate controlling agent and adsorbent were those employed in the tests described in conjunction with Table 3. All three samples were boiled for ½ hour, and then filtered through a 0.45 micron filter. The percentages of the calcium phosphate particles in each sample which were trapped by the filter were then determined as shown by Table 4.

TABLE 4

| Sample No. | Additives | Percent of calcium phosphate particles which passed through filter |
|---|---|---|
| 1 | None | 2 |
| 2 | Adsorbent (200 mgs.) | 24 |
| 3 | Adsorbent plus rate controlling agent | 53 |

It should be noted that in the absence of a rate controlling agent or adsorbent (Sample 1) the calcium phosphate particles were large, and consequently characterized by a high precipitation rate and a low adsorption potential due to the reduced time during which adsorption could occur, and the reduced surface area available for adsorption.

When the same system was prepared in the presence of an adsorbent (Sample 2), the resulting adsorption curtailed particle growth to yield more calcium phosphate patricles of a smaller size.

These results may be readily interpreted in light of the previously discussed studies. When neither a rate controlling agent nor an adsorbent were employed (Sample 1) the calcium and phosphate rapidly reacted to form calcium phosphate particles which grew and precipitated rapidly. As a consequence, 98% of the particles were unable to pass through the filter. When an adsorbent was added to the system (Sample 2) the physical barrier provided by the adsorption of the adsorbent upon the surface of the calcium phosphate particles inhibited particle growth to provide a greater number of small particles. When both an adsorbent and a rate controlling agent were utilized (Sample 3), the latter inhibited the reaction of the calcium and phosphate and the rate of growth and precipitation of the resultant particles, while the former provided the growth inhibiting effect described in respect to Sample 2. As a consequence, any calcium phosphate precipitated from the system would be optimally adsorbed with the adsorbent to provide a precipitate having a reduced tendency toward crystalline growth, e.g. to form scale, and being susceptible to ready removal by blowdown.

The best demonstration of the efficacy of the invention is provided by a study of its use in the actual treatment of boilers. Specifically, if the invention is operative the calcium and magnesium impurities will be precipitated in the desired form, little or no scale will be formed upon the boiler surfaces, and little or no sludge will remain in the boiler as the consequence of its removal during blowdown. The achievement of these goals is reflected by studies of the use of the invention in industrial boilers. In treatments of boilers with the inventive methods and materials for periods varying between 1 and 6½ months, consistent and often drastic improvements were noted. For example, boilers with scaled tubes and shells were found to be clean when opened after short treatment with the inventive materials and methods.

We claim:
1. A method for controlling scale formed from calcium and magnesium impurities in boiler water, which comprises adding to said water:
   (i) a water-soluble inorganic precipitating agent capable of reacting with and in an amount sufficient to react with at least said calcium impurities to form a precipitate,
   (ii) an acid having a dissociation constant of between 3 to 8, which is capable of and in an amount sufficient to control the reaction if said calcium impurity and said precipitating agent to the extent that precipitate particles are formed which can be effectively absorbed by an adsorbent, and
   (iii) an adsorbent which is capable of effectively adsorbing and in an amount sufficient to effectively adsorb the precipitate particles formed by the reaction of the calcium and the precipitating agent; wherein said precipitating agent is added in a quantity of at least 0.1 mole for each mole of said calcium impurities, wherein said acid is added in a quantity of between 0.05 to 0.9 mole for each mole of said calcium impurities, and wherein said adsorbent is added in a quantity of between 1 to 1,000 parts by weight for each million parts by weight of said water.

2. A method according to claim 1 wherein said acid is triglycollamic acid.

3. A method according to claim 1 wherein said acid is ethylenediaminetetraacetic acid.

4. A method according to claim 1 wherein said precitating agent is selected from the group consisting of water-soluble salts of phosphate, carbonate and silica.

5. A method according to claim 1 wherein said adsorbent is selected from the group consisting of lignosulfonate, lignin, tannin, starch, mannuronate salts, alginate salts, agar, polymeric polyelectrolytes having a molecular weight of between 5,000 to 15,000,000 and containing the group

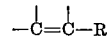

wherein R is selected from the group consisting of nitrile, amide, carboxyl, and carboxyl-alkyl, and the water soluble salts of said polyelectrolytes.

6. A method according to claim 5 wherein said precipitating agent is selected from the group consisting of water-soluble salts of phosphate, carbonate and silica.

7. A method according to claim 1 wherein said precipitating agent is sodium phosphate.

8. A method according to claim 1 wherein said precipitating agent is sodium metasilicate.

9. A method according to claim 1 wherein said adsorbent is a partially desulfonated sodium lignosulfonate.

References Cited

UNITED STATES PATENTS

| 3,085,975 | 4/1963 | Jennings | 252—181 X |
| 3,296,027 | 1/1967 | Jacklin | 252—180 X |
| 3,375,200 | 3/1968 | Robertson | 252—181 |

FOREIGN PATENTS

| 617,433 | 3/1961 | Canada. |

MAYER WEINBLATT, Primary Examiner

I. GLUCK, Assistant Examiner

U.S. Cl. X.R.

21—2.7; 134—3, 41; 210—58; 252—84, 181, 389